US008892114B2

(12) United States Patent
Mildh et al.

(10) Patent No.: US 8,892,114 B2
(45) Date of Patent: Nov. 18, 2014

(54) POWER SAVING IN A RADIO BASE STATION BY DETERMINING NUMBER OF ACTIVE AND IDLE USERS CAMPING ON CELL

(75) Inventors: Gunnar Mildh, Sollentuna (SE); Niklas Johansson, Sollentuna (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 97 days.

(21) Appl. No.: 13/380,384

(22) PCT Filed: Jun. 23, 2009

(86) PCT No.: PCT/SE2009/050795
§ 371 (c)(1),
(2), (4) Date: Dec. 22, 2011

(87) PCT Pub. No.: WO2010/151184
PCT Pub. Date: Dec. 29, 2010

(65) Prior Publication Data
US 2012/0100845 A1    Apr. 26, 2012

(51) Int. Cl.
*H04W 72/00*    (2009.01)
*H04W 52/02*    (2009.01)
*H04W 16/32*    (2009.01)
*H04W 88/08*    (2009.01)
*H04W 8/00*    (2009.01)
*H04W 64/00*    (2009.01)

(52) U.S. Cl.
CPC .......... *H04W 52/0274* (2013.01); *H04W 16/32* (2013.01); *H04W 52/0206* (2013.01); *Y02B 60/50* (2013.01); *H04W 88/08* (2013.01); *H04W 8/005* (2013.01); *H04W 52/0235* (2013.01); *H04W 64/00* (2013.01)
USPC .......... 455/453; 455/343.2; 455/522; 455/524

(58) Field of Classification Search
USPC .............................. 455/343.2, 522, 453, 524
See application file for complete search history.

(56) References Cited

U.S. PATENT DOCUMENTS 8,554,224 B2 * 10/2013 Soliman et al. ............... 455/436
2007/0275707 A1 * 11/2007 Kwak et al. ................ 455/414.2

(Continued)

FOREIGN PATENT DOCUMENTS

| CN | 101035308 A | 9/2007 |
| EP | 2056628 A1 | 5/2009 |

(Continued)

OTHER PUBLICATIONS

PCT International Preliminary Report on Patentability, mailed Jun. 9, 2011 for PCT International Application No. PCT/SE2009/050795, filed on Jun. 23, 2009.

(Continued)

*Primary Examiner* — Barry Taylor
(74) *Attorney, Agent, or Firm* — Myers Bigel Sibley & Sajovec, PA

(57) ABSTRACT

Methods of operating a radio base station of a first cell in a wireless cellular network are disclosed. Each of one or more user equipment devices of the wireless cellular network has an idle mode in which the radio base station is not aware of whether the user equipment device is currently camping on the first cell, and an active mode in which the radio base station is aware of whether the user equipment device is currently camping on the first cell. By setting the radio base station in a disabled state based on various criteria, energy may be saved in the radio base station.

27 Claims, 6 Drawing Sheets

(56) References Cited

U.S. PATENT DOCUMENTS

| | | |
|---|---|---|
| 2009/0042576 A1* | 2/2009 | Mukherjee et al. ............ 455/436 |
| 2010/0056184 A1* | 3/2010 | Vakil et al. ................. 455/456.5 |
| 2010/0290389 A1* | 11/2010 | Hou et al. ..................... 370/328 |
| 2010/0317394 A1* | 12/2010 | Harris et al. .................. 455/522 |
| 2010/0323705 A1* | 12/2010 | Iwamura et al. ............. 455/440 |
| 2011/0085611 A1* | 4/2011 | Laroia et al. .................. 375/260 |
| 2012/0281588 A1* | 11/2012 | Damnjanovic ............... 370/252 |

FOREIGN PATENT DOCUMENTS

| | | |
|---|---|---|
| EP | 2114093 A1 | 11/2009 |
| EP | 2141947 A1 | 1/2010 |
| TW | 200908759 A | 2/2009 |
| WO | WO02/07464 A1 | 1/2002 |

OTHER PUBLICATIONS

PCT International Search Report and the Written Opinion of the International Searching Authority, or the Declaration, mailed Apr. 8, 2010 for PCT International Application No. PCT/SE2009/050795, filed on Jun. 23, 2009.

Chinese Office Action Corresponding to Chinese Patent Application No. 200980160154.4; Date Mailed: Jan. 21, 2014; Foreign Text, 16 pages, English Translation Thereof, 7 Pages.

* cited by examiner

POWER SAVING IN A RADIO BASE STATION BY DETERMINING NUMBER OF ACTIVE AND IDLE USERS CAMPING ON CELL

CROSS REFERENCE TO RELATED APPLICATIONS

This application is a 35 U.S.C. §371 national stage application of PCT International Application No. PCT/SE2009/050795, filed on 23 Jun. 2009, the disclosure and content of which is incorporated by reference herein in its entirety. The above-referenced PCT International Application was published in the English language as International Publication No. WO 2010/151184 A1 on 29 Dec. 2010.

TECHNICAL FIELD

The present invention relates to a radio base station and a method of operating the radio base station.

BACKGROUND

There exists a wide variety of different types of wireless cellular communication networks, and further types are emerging e.g. through various standardization efforts. Examples of such wireless cellular networks are GSM (Global System for Mobile communications) networks, different CDMA (Code-Division Multiple Access) networks, such as WCDMA (Wideband CDMA) and CDMA2000 networks, and 3GPP LTE (3rd Generation Partnership Project Long Term Evolution) networks.

As the number of different wireless cellular networks increase, as well as the geographical coverage of the wireless cellular networks, the energy consumption of radio base station becomes more crucial. Accordingly, there is a need for saving energy in radio base stations.

SUMMARY

An object of the present invention is to save energy in a radio base station.

According to a first aspect, there is provided a method of operating a radio base station (BS) of a first cell in a wireless cellular network. Each one of one or more user equipment (UE) of the wireless cellular network has a first mode, in which the BS is not aware of whether or not the UE is currently camping on the first cell, and a second mode, in which the BS is aware of whether or not the UE is currently camping on the first cell. The method comprises issuing a first message from the BS for causing UEs in the first mode currently camping on the first cell to switch to the second mode such that the radio base station is made aware of which UEs are currently camping on the first cell. Furthermore, the method comprises, if the number of UEs currently camping on the first cell is less than or equal to a threshold level, disabling the radio base station for saving energy.

In some embodiments, the threshold level may be zero.

Furthermore, the method may comprise, if there are one or more UEs (15, 16) currently camping on the first cell, issuing a second message from the BS to the one or more UEs for causing each UE of the one or more UEs to determine whether it is within coverage of another cell of the wireless cellular network. The method may further comprise receiving information from the each one of the one or more UEs indicating whether the UE is within coverage of another cell of the wireless cellular network. Moreover, the method may comprise, if each UE of the one or more UEs is within coverage of another cell of the wireless cellular network, disabling the BS for saving energy.

Issuing the first message may comprise changing a tracking-area identity of the first cell for causing the UEs in the first mode currently camping on the first cell to perform a tracking area update.

Alternatively, issuing the first message may comprise broadcasting the first message in the first cell from the BS, wherein the first message is an explicit message requesting that UEs in the first mode currently camping on the first cell switch to second mode.

According to a second aspect, there is provided a method of operating a BS of a first cell in a wireless cellular network. Each one of one or more UEs of the wireless cellular network has a first mode, in which the BS is not aware of whether or not the UE is currently camping on the first cell, and a second mode, in which the BS is aware of whether or not the UE is currently camping on the first cell. The method comprises broadcasting a first message from the BS for causing each UE in the first mode currently camping on the first cell to determine whether a condition indicative of network coverage for the UE in at least one other cell of the wireless cellular network is fulfilled and, if the condition is not fulfilled, to respond to the first message.

The method may comprise, if the number of UEs that respond to the first message is less than or equal to a threshold level, disabling the BS for saving energy.

Alternatively, the method may comprise receiving information from one or more neighboring cells indicative of whether there is any UE camping on any of the neighboring cells in a border area between the first cell and that neighboring cell. Moreover, the method may comprise if the number of UEs that respond to the first message is less than or equal to a threshold level and said information from the neighboring cell indicates that there is no UE camping on any of the neighboring cells in a border area between the first cell and that neighboring cell, disabling the BS for saving energy.

In any of the above alternatives, said threshold level may be zero.

The condition indicative of network coverage may be that the UE is within coverage of the at least one other cell.

Alternatively, the condition indicative of network coverage may be that a signal-quality metric measured by the UE is below a signal-quality threshold.

The signal-quality metric may be an absolute signal-quality metric measured by the UE on the first cell. For example, the signal-quality metric may be a path loss measured by the UE on the first cell.

Alternatively, the signal-quality metric may be a relative signal-quality metric of the signal quality measured by the UE on the first cell relative to the signal quality measured by the UE on the at least one other cell. For example, said relative signal-quality metric may be the relative path loss determined by the difference in decibels between the path loss measured by the UE on the first cell and the path loss measured by the UE on the at least one other cell.

Said signal-quality threshold may be a parameter signaled to the UE over a radio interface. Alternatively, said signal-quality threshold may be a pre-defined value or parameter.

According to a third aspect, there is provided a method of operating a BS of a first cell in a wireless cellular network. Each one of one or more UEs of the wireless cellular network has a first mode, in which the BS is not aware of whether or not the UE is currently camping on the first cell, and a second mode, in which the BS is aware of whether or not the UE is currently camping on the first cell. The method comprises:

A) enabling the BS; and

B) performing the method according to the first or the second aspect.

The method may comprise waiting for a predetermined first time period after the execution of step A) before performing step B).

According to a fourth aspect, there is provided a method of operating a BS of a first cell in a wireless cellular network. Each one of one or more UEs of the wireless cellular network has a first mode, in which the BS is not aware of whether or not the UE is currently camping on the first cell, and a second mode, in which the BS is aware of whether or not the UE is currently camping on the first cell. The method comprises:

a) performing the method according to the third aspect; and b) if the execution of step a) causes the BS to be disabled, repeating step a) after the lapse of a predetermined second time period.

According to a fifth aspect, there is provided a method of operating a BS of a first cell in a wireless cellular network, wherein the BS is initially in a disabled state. Each one of one or more UEs of the wireless cellular network has a first mode, in which the BS is not aware of whether or not the UE is currently camping on the first cell, and a second mode, in which the BS is aware of whether or not the UE is currently camping on the first cell. The method comprises receiving information from one or more neighboring cells indicative of whether there is any UE camping on any of the neighboring cells, wherein a signal-quality metric measured by that UE on each one of a set of cells is below a threshold value. Furthermore, the method comprises, if said information indicates that there is such a UE, enabling the BS.

Said information may be exchanged between BSs over an X2 interface in an Evolved Universal Terrestrial Radio Access Network (E-UTRAN).

The method may comprise, after enabling the BS, performing the method according to the first or second aspect.

In any of the first, second, third, fourth, and fifth aspect, the wireless cellular network may be a Global System for Mobile communications (GSM) network, a Wideband Code-Division Multiple Access (WCDMA) network, a 3rd Generation Partnership Project Long Term Evolution (3GPP LTE) network, a Code-Division Multiple Access 2000 (CDMA2000) network, or any combination thereof.

Furthermore, in any of the first, second, third, fourth, and fifth aspect the first mode may be an idle mode and the second mode may be an active mode.

According to a sixth aspect, there is provided a computer program product comprising computer program code means for executing the method according to any of the first, second, third, fourth, and fifth aspect when said computer program code means are run by a programmable control unit arranged to control the BS.

According to a seventh aspect, there is provided a computer readable medium having stored thereon a computer program product comprising computer program code means for executing the method according to any of the first, second, third, fourth, and fifth aspect when said computer program code means are run by a programmable control unit arranged to control the BS.

According to an eighth aspect, there is provided a control unit for a BS of a wireless cellular network, wherein the control unit is adapted to perform the method according to any of the first, second, third, fourth, and fifth aspect.

According to a ninth aspect, there is provided BS for a wireless cellular network comprising a control unit according to the eighth aspect.

According to a tenth aspect, there is provided a wireless cellular network comprising one or more control units according to the eighth aspect.

According to an eleventh aspect, there is provided a wireless cellular network comprising one or more BSs according to the ninth aspect.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
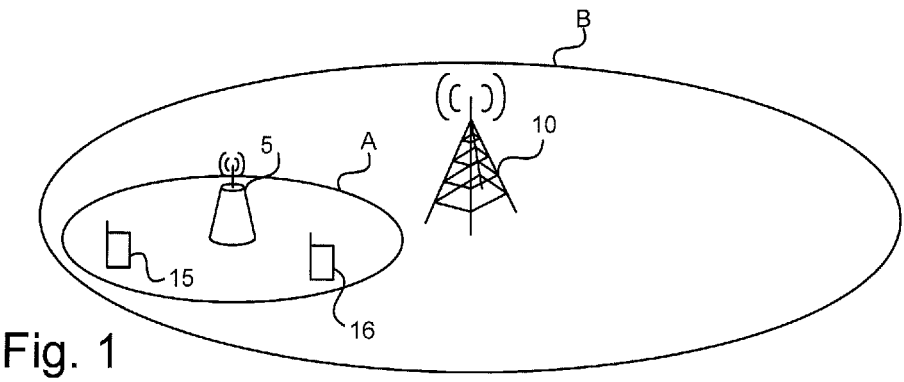
FIGS. 1-3 illustrate three different example scenarios used for illustration of embodiments of the present invention.

In accordance with embodiments of the present invention, energy is saved in a radio base station (BS) by disabling the BS when it is not being used, e.g. when there is no user equipment (UE), such as mobile phone or the like, currently requiring the cell served by the BS to be operational in order to maintain network coverage. For example, some BSs may have a geographical location and coverage, such as in an office building, making it possible to disable the BS during certain time periods, e.g. during nights.

Disabling the BS may e.g. include turning off one or more transmitter of the BS, receiver of the BS, or parts thereof, thereby saving energy compared with if said transmitter, receiver, or parts thereof were in operation. As a result of disabling the BS, the cell served by the BS is switched off.

UEs for wireless cellular networks, such as GSM (Global System for Mobile communications) networks, different CDMA (Code-Division Multiple Access) networks, such as WCDMA (Wideband CDMA) and CDMA2000 networks, and 3GPP LTE (3rd Generation Partnership Project Long Term Evolution) networks, normally have an active mode and an idle mode. If a UE in the active mode is camping on the cell of the BS, the BS is aware of that the UE is camping on the cell. However, in the idle mode, the UE is not known by the network on cell or sector level. Instead the UE may be camping on any cell belonging to a tracking area (TA, also sometimes referred to as Location Area/Routing Area/Registration Area) in which the UE is registered. When the network wants to reach a UE in idle mode, it will need to broadcast a page message through all cells in the TA, which is consuming energy and communication resources. If the UE enters cells which belong to a TA in which it is not registered, the UE will perform a TA update signaling procedure. During this procedure the UE will for a short while be known on cell level (active state). In the description of embodiments below, reference is made to the above-mentioned active mode and idle mode. In a more general sense, a UE may have a first mode (corresponding to the idle mode), in which the BS is not aware of whether or not the UE is currently camping on the cell of the BS, and a second mode (corresponding to the active mode), in which the BS is aware of whether or not the UE is currently camping on the cell of the BS.

A risk with disabling a BS is that one or more UEs may experience a temporarily disrupted service, or may even lose network coverage altogether and therefore not be able to access any services at all. When a BS is disabled, it will stop broadcasting pilot or reference signals, which means that any UE that was camping on the cell of the BS will need to search for another suitable cell to camp on. To make sure that the UEs in active mode camping on a cell of a first BS does not lose network coverage if the first BS is disabled, the BS may instruct these UEs to determine whether they are within the coverage of another BS of the network. If each of these UEs is within the coverage of another BS, the first BS may be disabled without risking that any of these UEs lose network coverage. In case there are any UEs in active mode transmitting or receiving data on the cell of the first BS, the network may initiate handover procedures so that the UEs can be transferred to other cells without causing disturbances to ongoing services of the UEs.

However, the network is not aware of if there are any UEs in idle mode camping on the cell of the first BS. Furthermore, the network is not aware of if there is any UE which is only in coverage of the cell of the first BS. Hence, there is a risk that UEs in idle mode lose network coverage when the first BS is disabled. One possible solution to this problem could be that the network pages all UEs in idle mode in a TA (through all cells of the TA as discussed above) before attempting to disable the first BS. This will cause each UE in idle mode to switch to active mode and to contact the network through the cell they are currently camping on. Thereby, it would be possible to determine if the first BS can be safely disabled, since there are no longer any UEs in idle mode in the TA, and the procedure outlined above for UEs in active mode can be applied. A drawback with this solution is that a TA can cover many cells which would mean that there could be many UEs camping in the TA and paging all of these UEs would consume energy and communication resources.

Figure 2:
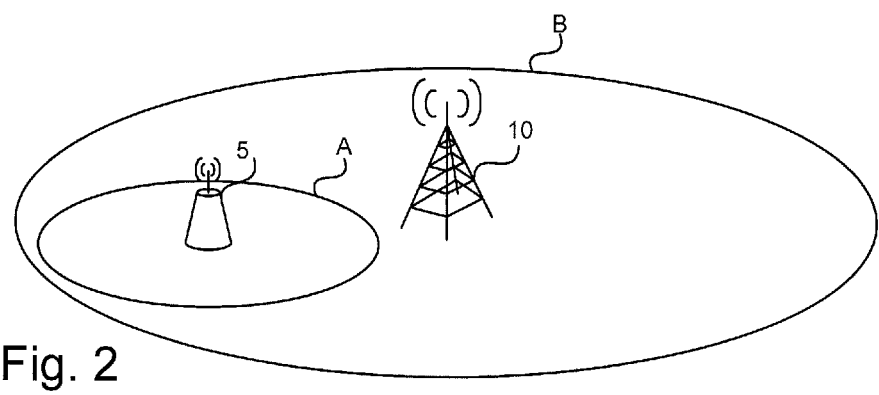
Figure 3:
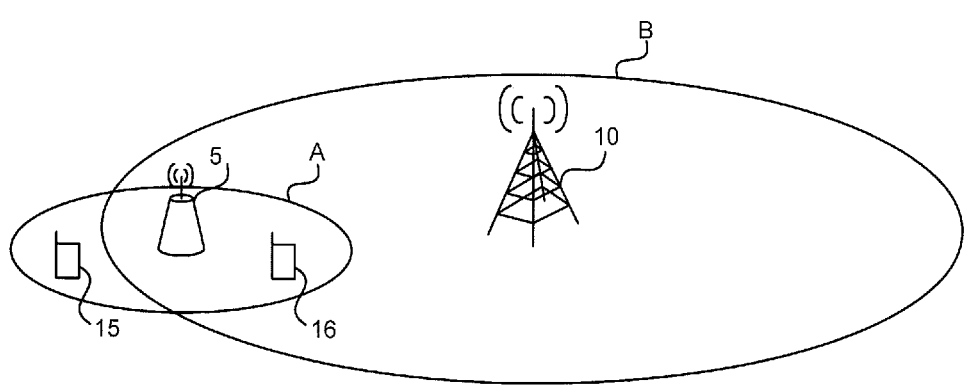

FIGS. 1-3 illustrate three different example scenarios used for illustration of embodiments of the present invention. In these figures, a BS 5 and a BS 10, of the same wireless cellular network, are present. The BS 5 serves a cell A and the BS 10 serves a cell B. In the examples, cell B has a larger geographical coverage than cell A. The BS 10 may e.g. be a so called macro BS, and the BS 5 may e.g. be a so called micro, pico, or femto BS, a BS for an indoor system, a relay, or a repeater.

In FIG. 1, two UEs 15 and 16 are camping on cell A. Furthermore, both UEs 15 and 16 are within the coverage of the BS 10, i.e. within the cell B. Hence, in this case, the BS 5 can be disabled without risking that any of the UEs 15 and 16 loses network coverage.

In FIG. 2, there are no UEs camping on cell A. This is another example where the BS 5 may be disabled without risking that any UE loses network coverage.

The scenario of FIG. 3 is similar to that of FIG. 1. Two UEs 15 and 16 are camping on cell A. However, in FIG. 3, the UE 15 is not within the coverage of any other BS. Hence, if the BS 5 is disabled, the UE 15 will lose network coverage. Hence, the BS 5 should be kept in an enabled state in order to avoid that the UE 15 loses network coverage.

It should be noted that the illustrations in FIGS. 1-3 are only examples used to elucidate embodiments of the present invention. In a real-world scenario, there may of course be more than two BSs and cells, and more than two UEs may be involved.

According to embodiments of the present invention, there is provided a method 90 (FIGS. 4-6) of operating a BS of a first cell in a wireless cellular network, wherein each one of one or more UEs of the wireless cellular network has an idle mode, in which the BS is not aware of whether or not the UE is currently camping on the first cell and an active mode, in which the BS is aware of whether or not the UE is currently camping on the first cell. Embodiments of the method are presented below with reference to the examples in FIGS. 1-3. In the presentation of the embodiments, reference is made to cell A (FIGS. 1-3) as the first cell, and to the BS 5 (FIGS. 1-3) as the BS of the first cell. However, the method is applicable to any other BSs and cells, such as the BS 10 and cell B.

In accordance with some embodiments of the present invention, the method 90 comprises issuing a first message from the BS 5 for causing UEs in idle mode currently camping on the first cell A to switch to the active mode such that the BS 5 is made aware of which UEs are currently camping on the first cell A. Furthermore, the method 90 comprises, if there are no UEs currently camping on the first cell A, disabling the BS 5 for saving energy.

Figure 4:
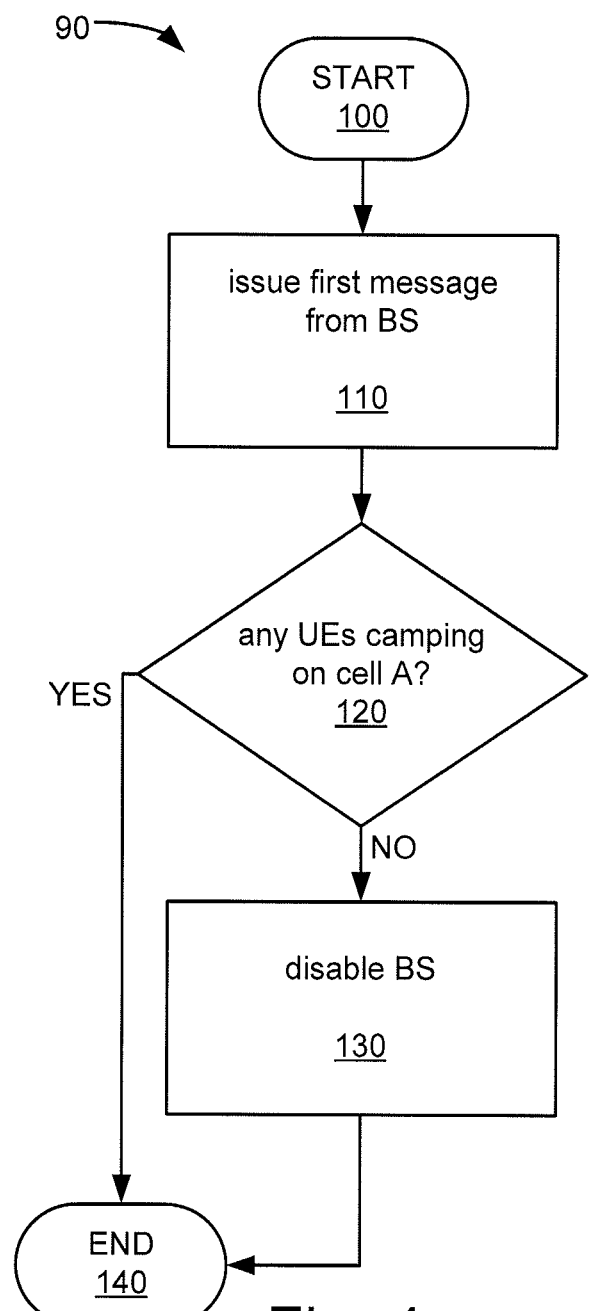
FIGS. 4-9 are flowcharts for methods according to embodiments of the present invention.

FIG. 4 is a flowchart for an embodiment of the method 90. The operation of the embodiment is started in step 100. When the operation is started, the BS 5 is in an enabled state. In step 110, the first message is issued from the BS 5. As a consequence, the UEs in idle mode (if any) camping on the first cell A are caused to switch to the active mode, whereby the BS 5 is made aware of all UEs currently camping on the first cell A. In step 120, it is checked whether there are any UEs camping on the first cell A. If so, the operation proceeds to step 140, wherein the method 90 is ended according to the embodiment. If there are no UEs currently camping on the first cell A, the operation instead proceeds to step 130, wherein the BS 5 is disabled. Thereafter, the operation proceeds to step 140 described above.

According to other embodiments, it may be acceptable according to network policies that a few UEs lose network coverage. Hence, in these embodiments, step 120 may instead comprise determining whether the number of UEs camping on the first cell A is less than or equal to a threshold level. If the number of UEs camping on the first cell A is less than or equal to the threshold level, the operation may proceed from step 120 to step 130. Otherwise, the operation may proceed from step 120 to step 140. The same modifications can be applied to step 120 of the embodiment illustrated in FIG. 5 described below.

Consider the embodiment illustrated in FIG. 4 together with the example scenario in FIG. 1. Since the UEs 15 and 16 are camping on the first cell A, the operation will in this case follow the YES branch from step 120, and the operation of the method 90 will be ended in step 140 without the BS 5 being disabled.

Furthermore, consider the embodiment illustrated in FIG. 4 together with the example scenario in FIG. 2. Since no UEs are camping on the first cell A, the operation will in this case follow the NO branch from step 120, and the BS will be disabled in step 130, before the operation of the method 90 is ended in step 140, whereby energy is saved.

Moreover, consider the embodiment illustrated in FIG. 4 together with the example scenario in FIG. 3. Since the UEs 15 and 16 are camping on the first cell A, the operation will in this case follow the YES branch from step 120, and the operation of the method 90 will be ended in step 140 without the BS 5 being disabled.

Figure 5:
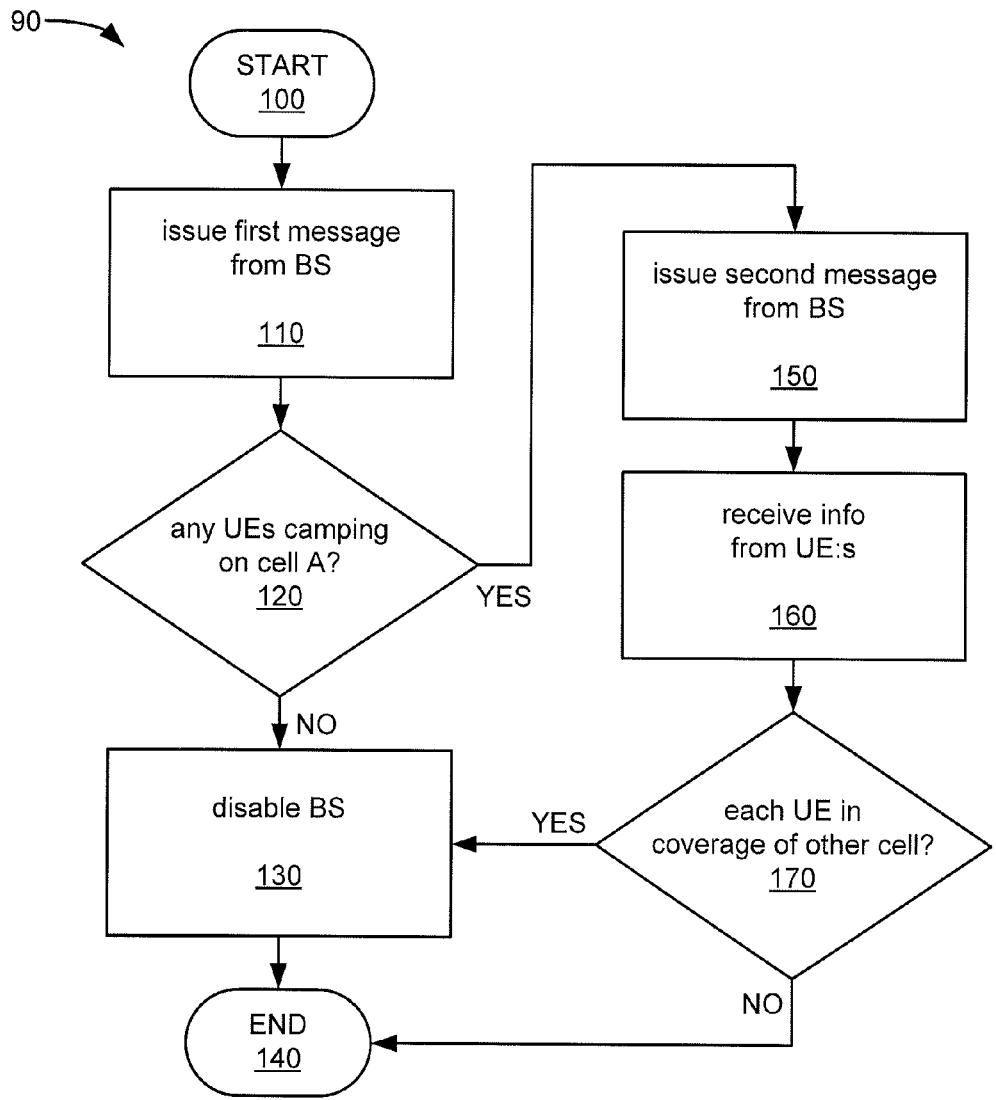

Hence, the embodiment of the method 90 illustrated in FIG. 4 enables energy savings in scenarios where there are no UEs currently camping on the first cell A, such as the scenario of the example illustrated in FIG. 2. However, as discussed above, it is possible to disable the BS 5 without risking that any UEs lose network coverage also when all UEs currently camping on the first cell A is within coverage of another BS, such as in the example scenario illustrated in FIG. 1, wherein the UEs 15 and 16 are within the coverage of the BS 10. To enable energy savings also in such scenarios, the method 90 may further comprise, in the event that there is one or more UEs currently camping on the first cell A, issuing a second message from the BS 5 to the one or more UEs for causing each UE of the one or more UEs to determine whether it is within coverage of another cell of the wireless cellular network. For example, the wireless cellular network may order the UEs to perform measurements on neighboring cells. Furthermore, the method 90 may then comprise receiving information from the each one of the one or more UEs indicating whether the UE is within coverage of another cell of the wireless cellular network. Moreover, the method 90 may then comprise, if each UE of the one or more UEs is within coverage of another cell of the wireless cellular network, disabling the BS 5 for saving energy. FIG. 5 is a flowchart for an embodiment of the method 90 including these additional steps.

Steps in the embodiment illustrated in FIG. 5 that are similar or the same as the steps of the embodiment illustrated in FIG. 4 are designated with the same reference numbers in FIG. 5 as in FIG. 4 and are not further described in detail. A difference between the embodiments illustrated in FIG. 5 and FIG. 4 is that in FIG. 5, if it is concluded in step 120 that there are one or more UEs currently camping on the first cell A, the operation of the method 90 proceeds to step 150 (instead of step 140, which is the case in FIG. 4).

In step 150, the second message is issued from the BS 5 to the one or more UEs currently camping on the first cell A for causing each UE of the one or more UEs to determine whether it is within coverage of another cell of the wireless cellular network. In step 160, information is received from the each one of the one or more UEs indicating whether the UE is within coverage of another cell of the wireless cellular network. In step 170 it is checked, based on the received information, whether each UE of the one or more UEs is within coverage of another cell of the wireless cellular network. If so, the operation of the method proceeds to step 130, wherein the BS 5 is disabled. If not (i.e. if at least one of the one or more UEs is not within coverage of another cell of the wireless cellular network), the operation of the method proceeds to step 140, wherein the operation of the method 90 is ended. If there are one or more UEs in active mode transmitting and/or receiving data via the BS 5, the step 130 of disabling the BS 5 may include a handover process of these UEs to another cell, such that disruption of ongoing services for these UEs can be avoided.

Consider the embodiment illustrated in FIG. 5 together with the example scenario in FIG. 1. Since the UEs 15 and 16 are camping on the first cell A, the operation will in this case follow the YES branch from step 120, and the operation of the method 90 will proceed to step 150. Since both UEs are within coverage of another cell (cell B), the operation will in this case follow the YES branch from step 170 to step 130, wherein the BS 5 is disabled, before the operation of the method 90 is ended in step 140, whereby energy is saved.

Furthermore, consider the embodiment illustrated in FIG. 5 together with the example scenario in FIG. 2. For this scenario, the operation is the same as for the embodiment illustrated in FIG. 4. Since no UEs are camping on the first cell A, the operation will in this case follow the NO branch from step 120, and the BS will be disabled in step 130, before the operation of the method 90 is ended in step 140, whereby energy is saved.

Moreover, consider the embodiment illustrated in FIG. 5 together with the example scenario in FIG. 3. Since the UEs 15 and 16 are camping on the first cell A, the operation will in this case follow the YES branch from step 120, and the operation of the method 90 will proceed to step 150. Since the UE 15 is not within coverage of another cell, and therefore will lose network coverage if the BS 5 is disabled, the operation will in this case follow the NO branch from step 170, and the operation of the method 90 will be ended in step 140 without the BS 5 being disabled.

One way of causing the UEs in idle mode camping on the BS 5 to switch to active mode, which is utilized in some embodiments of the present invention, is to change the TA identity of the first cell A, such as to a TA identity not normally used. The TA identity is normally broadcasted regularly in the cell as part of system information, which is broadcasted relatively frequently. This will cause the UEs in idle mode currently camping on the first cell A to perform a TA update signaling procedure, whereby it will switch to the active mode as described above. UEs camping on other cells in the same TA will not perform any TA update signaling procedure due to the change in TA identity of the first cell A. Once the UEs in idle mode have switched to the active mode, the TA identity of the first cell A may be changed back to the original TA identity of cell A. An advantage of changing the TA identity for causing the UEs in idle mode to switch to active mode is backward compatibility with existing UEs, such as existing GSM and WCDMA terminals and 3GPP LTE Rel-8 terminals. Hence, normally, no modifications of existing UEs would be necessary.

Hence, according to some embodiments of the method 90, the step 110 (FIGS. 4 and 5) of issuing the first message comprises changing the TA identity of the first cell A for causing the UEs in idle mode currently camping on the first cell A to perform a TA update signaling procedure.

According to other embodiments, the first message is an explicit message broadcasted in the first cell A, telling UEs in idle mode camping on the first cell A that they should contact the wireless cellular network. In response thereto, said UEs in idle mode switch to active mode in order to be able to contact the wireless cellular network.

Accordingly, in some embodiments of the method 90, the step 110 (FIGS. 4 and 5) of issuing the first message comprises broadcasting the first message in the first cell A from the BS 5, wherein the first message is an explicit message requesting that UEs in idle mode currently camping on the first cell A switch to active mode.

According to some embodiments, said first message may be a message for causing each UE in idle mode currently camping on the first cell A to determine whether a condition indicative of network coverage for the UE in at least one other cell is fulfilled and, if the condition is not fulfilled, to respond to the explicit first message. Hence, in these embodiments, only UEs for which said condition is not fulfilled responds to the message. If no UE responds to the first message, this is an indication that no UE will lose network coverage if the BS 5 is disabled. The explicit first message can be repeated to make sure all UEs receive it. These embodiments may be performed when there are no UEs in active mode currently camping on the first cell A, or if it is known that each UE in active mode is within coverage of another cell of the wireless cellular network. The performance of these embodiments may be preceded by a handover process for one or more of the UEs in active mode currently camping on the first cell A.

Accordingly, in some embodiments of the present invention, the method 90 comprises broadcasting the first message from the BS 5, wherein the first message is a message for causing each UE in idle mode currently camping on the first cell A to determine whether a condition indicative of network coverage for the UE in at least one other cell of the wireless cellular network is fulfilled and, if the condition is not fulfilled, to respond to the first message. Furthermore, in some of these embodiments, the method 90 comprises, if no UE responds to the first message, disabling the BS 5 for saving energy. According to other embodiments, it may be acceptable according to network policies that a few UEs lose network coverage. Hence, in some embodiments, the method 90 comprises, if the number of UEs that respond to the first message is less than or equal to a threshold level, disabling the BS 5 for saving energy. A flowchart for such an embodiment of the method 90 is shown in FIG. 6.

Figure 6:
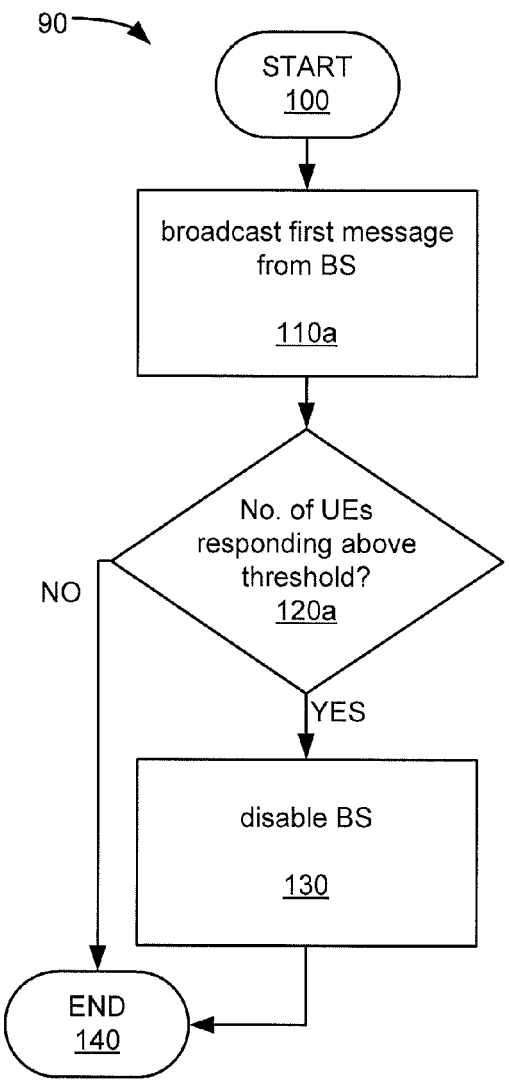

The operation of the embodiment illustrated in FIG. 6 is started in step 100. In step 110a, the first message is broadcasted from the BS 5. As a consequence, each UE in idle mode (if any) camping on the first cell A are caused determine whether the condition is fulfilled and, if the condition is not fulfilled respond to the first message. In step 120a, it is checked whether the number of UEs that respond to the first message is above the threshold level. If the number of UEs that respond to the first message is above the threshold level, the operation proceeds to step 140, wherein the method 90 is ended according to the embodiment. Otherwise, the operation instead proceeds to step 130, wherein the BS 5 is disabled. Thereafter, the operation proceeds to step 140 described above.

In alternative embodiments, it may also be taken into account how UEs camping on neighboring cells are affected if the BS 5 is disabled. For example, information can be received from one or more neighboring cells indicative of whether there is any UE camping on any of the neighboring cells in a border area between the first cell and that neighboring cell. Such a UE may have relatively poor signal quality from the neighboring cell and may lose network coverage if the BS 5 is disabled and e.g. the UE moves away from BS of the cell it is currently camping on. The BS 5 may in such embodiments be disabled if the number of UEs that respond to the first message is less than or equal to the threshold level and said information from the neighboring cell indicates that there is no UE camping on any of the neighboring cells in a border area between the first cell A and that neighboring cell.

In some of these embodiments, said condition is that the UE is within coverage of the at least one other cell, such as the cell B, of the wireless cellular network. Hence, in these embodiments, only UEs that are not within coverage of other cells will respond to the explicit first message. Thereby, the BS 5 can be safely disabled if no UEs are responding to the explicit first message. Whether a UE is within coverage of other cells can be determined autonomously by the UE through measurements on pilots/reference symbols of neighboring cells.

According to other embodiments said condition is that a signal-quality metric measured by the UE is below a signal-quality threshold. The signal-quality metric may be an absolute signal-quality metric measured by the UE on the first cell A. Alternatively, the signal-quality metric may be a relative signal-quality metric of the signal quality measured by the UE on the first cell A relative to the signal quality measured by the UE on another cell, such as the cell B. The other cell may be the strongest neighboring cell. Alternatively, the identity of the other cell can be signaled to the UE from the BS 5. The signal-quality threshold, which may be absolute or relative, may e.g. be signaled to the UE from the BS 5 in the first message, or in another message or by any suitable means, e.g. over a radio interface. The signal-quality threshold, which may be absolute or relative, e.g. can also be a pre-defined value in the standard. The signal-quality threshold can also be specific for each UE implementation. The absolute signal-quality threshold and relative signal-quality threshold are used for comparison with absolute signal-quality metric and relative signal-quality metric measured by the UE. Normally, in order to provide adequate geographical network coverage, wireless cellular networks are planned such that when a UE is in a location such that the received signal quality from one cell is below a certain acceptable level, there is another (neighboring) cell located such that it provides an adequate signal quality for the UE in that location. Therefore, the signal-quality threshold may be selected (e.g. based on knowledge of the network plan, neighboring cell deployment and layout, etc.) such that, when the signal-quality metric is below the signal-quality threshold, it is certain (or certain to a given probability) that the UE is within coverage of another cell with adequate signal quality.

The signal-quality metric and signal-quality threshold may be expressed in terms of serving cell downlink path loss, serving cell received signal strength, such as RSRP (Reference Signal Received Power) in 3GPP LTE or CPICH (Common Pilot Channel) RSCP (Received Signal Code Power) in UTRAN (UMTS (Universal Mobile Telecommunications System) Terrestrial Radio Access Network), serving cell received signal quality, such as RSRQ (Reference Signal Received Quality) in 3GPP LTE or CPICH Ec/No in UTRAN, or similar quantities.

First, examples of the use of an absolute signal-quality metric are given. Consider two examples in which the UE compares the absolute measured path loss (which is the absolute signal-quality metric in the examples) with the corresponding absolute path loss threshold (which is the signal-quality threshold in the examples) to decide whether or not it should respond to the first message.

In both examples, the absolute path loss threshold is −80 dBm. In the first example, the measured path loss (from the first cell A) is −100 dBm. Since this value is less than the threshold value, the UE shall not respond to the first message (because the threshold has been selected such that it is certain, or certain to a given probability, that the UE can be adequately served by a neighboring cell if the BS 5 is disabled).

In the second example, the measured path loss (from the first cell A) is −70 dBm. Since this value exceeds the threshold value the UE shall respond to the first message (because the UE may risk losing network coverage if the BS 5 is disabled).

Secondly, examples of the use of a relative signal-quality metric are given. In these examples the relative path loss measured in dB, i.e. the difference between the path loss measured (in dB scale) from the first cell and the path loss measured from the other cell (in dB scale), is the relative signal-quality metric. Two examples are given. In both examples, relative path loss threshold (which is the relative signal-quality threshold in the examples) is 30 dB.

In the first example, the path loss from the first cell A is −70 dBm and the path loss from the other cell is −90 dBm. The relative path loss is then 20 dB. Since this is less than the threshold, the UE shall not respond to the first message (because the threshold has been selected such that it is certain, or certain to a given probability, that the UE can be adequately served by the other cell if the BS 5 is disabled).

In the second example, the path loss from the first cell A is −70 dBm and the path loss from the other cell is −110 dBm. The relative path loss is then 40 dB. Since this value exceeds the threshold value the UE shall respond to the first message (because the UE may risk losing network coverage if the BS 5 is disabled).

Similar considerations apply to other signal-quality metrics and thresholds than those based on path loss, such as those exemplified above.

Above, the situation is considered when the BS 5 is already in an enabled state, and it is checked whether the BS 5 can be disabled for saving energy. As is described with embodiments of the present invention below, the method 90 can also be utilized in a start-up phase when the BS 5 is initially in the disabled state. The BS 5 may be enabled for a while to see if there are any UEs which should be served by the first cell A. The method 90 described above with reference to various embodiments may in such a scenario be used for discovering UEs in idle mode that should be served by the first cell A.

According to some embodiments of the present invention, there is therefore provided a method 200 of operating the BS 5, comprising enabling the BS 5 and performing the method 90 described above with reference to various embodiments. According to some embodiments, the method 90 is performed after that a predetermined first time period has lapsed from that the BS 5 was enabled. The first time period may e.g. be selected such that UEs have sufficient time to perform cell reselection, read new system information and perform tracking area update. Other factors that may be considered when selecting the first time period include a desired amount of energy to be saved, the number of users in the system, and the time of the day. For example, a shorter time period could be selected during busy hours of the day, but a longer time period is affordable during the night. The first time period may e.g. be, but is not limited to, 10 seconds or in the order of 10 seconds.

Figure 7:
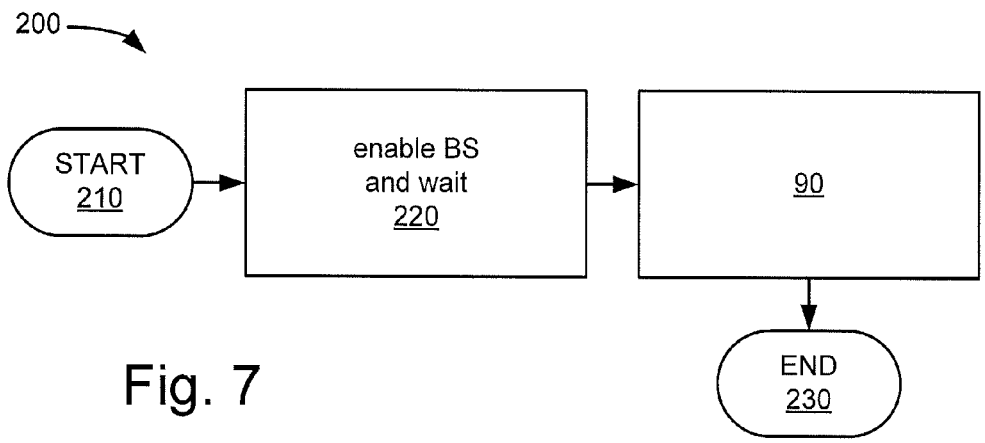

FIG. 7 is a flowchart for an embodiment of the method 200. The method is started in step 210. In step 220, the BS 5 is enabled and the operation of the method 200 is halted for the first time period. Thereafter, the method 90 is performed, and the operation of the method 200 is ended in step 230.

The method 200 may be repeated, e.g. with a regular interval. For example, the method 200 may be repeated until there are one or more UEs that require the first cell A to be operational in order to have network coverage. According to some embodiments, the method 200 may be repeated as long as the execution of the method 90 (as part of the method 200) causes the BS 5 to be disabled.

According to some embodiments of the present invention, there is therefore provided a method 300 of operating the BS 5 comprising:

a) performing the method 200 described above with reference to various embodiments and b) if the execution of step a) causes the BS 5 to be disabled, repeating step a) after the lapse of a predetermined second time period.

Figure 8:
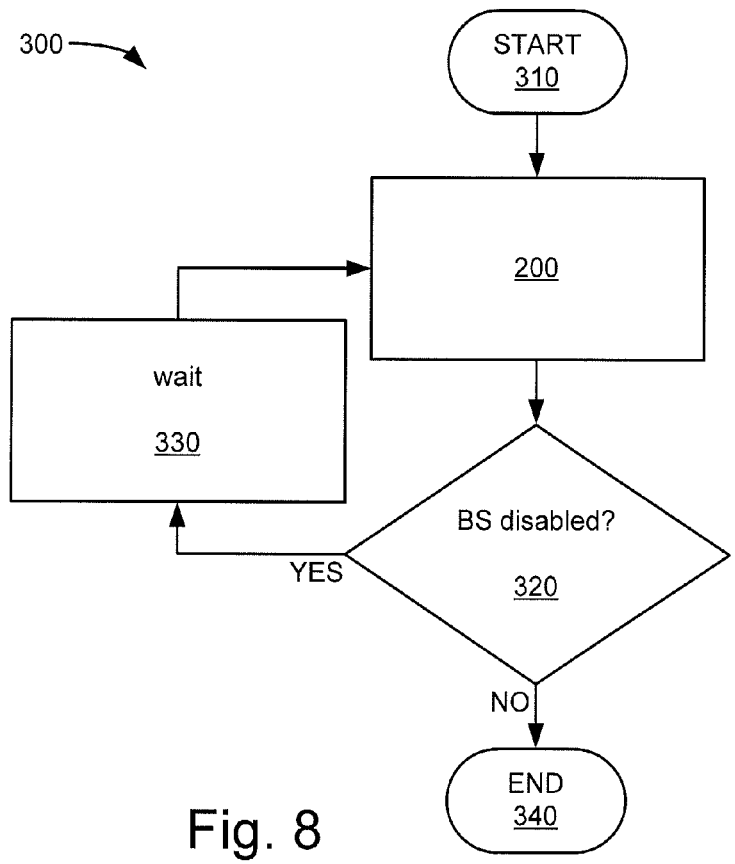

FIG. 8 is a flowchart for an embodiment of the method 300. The operation of the method 300 is started in step 310. Thereafter, the method 200, described above with reference to various embodiments, is performed. In step 320, it is checked whether the execution of the method 200 has resulted in the BS 5 being disabled.

If it is concluded in step 320 that the execution of the method 200 has resulted in that the BS 5 is disabled, the operation of the method 300 is halted for the second time period. Thereafter the execution of the method 200 is repeated, and the operation of the method 300 thereafter again proceeds to step 320.

If, on the other hand, it is concluded in step 320 that the execution of the method 200 has not resulted in that the BS 5 is disabled (i.e., the BS 5 is still in the enabled state), the operation of the method 300 proceeds from step 320 to step 340, wherein the operation of the method 300 is ended.

According to some embodiments of the present invention, a decision of whether or not to enable the BS 5 may be based on information from one or more neighboring cells (such as the cell B) indicative of whether there is any UE camping on any of the neighboring cells that may need the first cell A to be operational in order to get adequate network coverage, e.g. if the UE is located in a border region between the first cell A and a neighboring cell and has poor, or inadequate, signal quality from each one of a set of cells (the set of cells may e.g. consist of the neighboring cell, all cells the UE is within coverage of, or a subset thereof). For example, each of the neighboring cells may issue messages to UEs camping on the cell to perform signal-quality measurements and compare them with signal-quality thresholds, similarly to the examples presented above for embodiments of the method 90 illustrated in FIG. 6. Communication may take place between several cells (e.g. over a BS-BS interface such as X2 in 3GPP LTE), or between the cells and a radio network controller (RNC) (e.g. over a BS-RNC interface such as Iub in UTRAN), to determine whether there is any UE that does not have adequate signal quality from any of the cells and/or if it is likely that the UE would have an improved signal quality from the (currently disabled) BS 5 if the BS 5 is enabled.

Accordingly, according to some embodiments of the present invention, there is provided a method 342 of operating the BS 5, wherein the BS 5 is initially in a disabled state. The method 342 comprises receiving information from one or more neighboring cells indicative of whether there is any UE camping on any of the neighboring cells, wherein a signal-quality metric measured by the UE on each one of a set of cells is below a threshold value. Furthermore, the method 342 comprises, if said information indicates that there is such a UE, enabling the BS 5.

Figure 9:
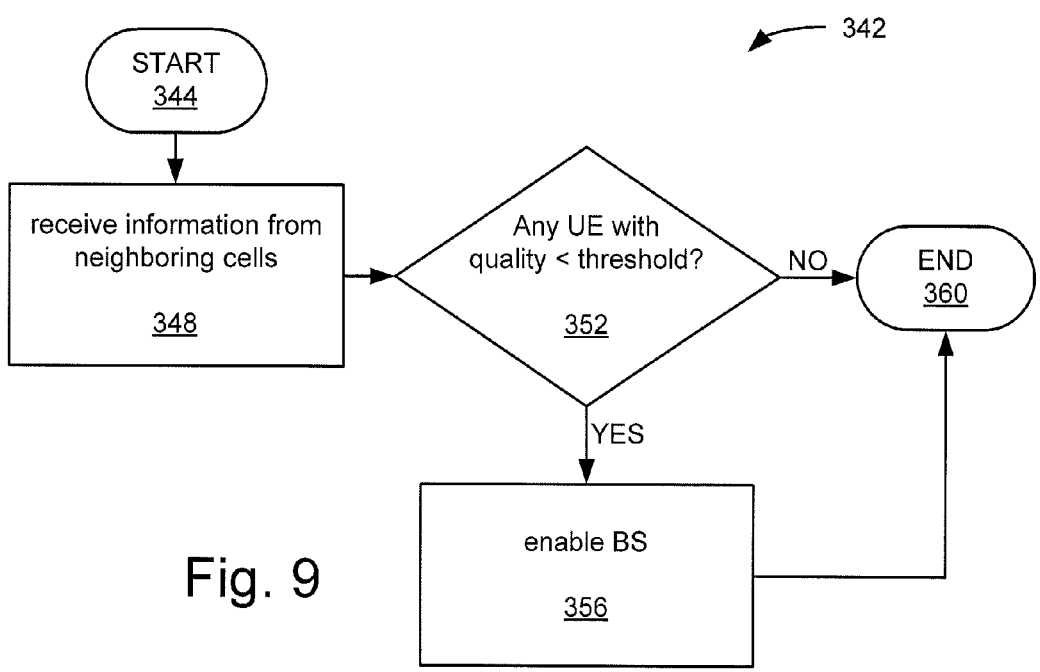

An embodiment of the method 342 is illustrated with a flowchart in FIG. 9. According to the embodiment, the operation of the method 342 is started in step 344. In step 348, the information from the neighboring cells is received. In step 352, it is checked, based on the received information, whether there is any UE camping on any of the neighboring cells, for which a signal-quality metric measured by the UE on each one of a set of cells is below a threshold value. If there is such a UE, the BS is enabled in step 356, and the operation thereafter proceeds to step 360, wherein the method is ended according to the embodiment. Otherwise, the operation proceeds directly to step 360 from step 352. According to some embodiments, the method 90, described above with reference to various embodiments, may be performed after the BS 5 has been enabled. For example, the step 356 in the flowchart of FIG. 9 may be replaced by the method 200 described above with reference to various embodiments.

The methods 90, 200, 300, and 342 described above with reference to various embodiments may be applied in wireless cellular networks such as GSM networks, WCDMA networks, 3GPP LTE networks and CDMA2000 networks, but are not limited thereto. Furthermore, the wireless cellular network may be a combination of two or more such networks. For example, the wireless cellular network may comprise one or more GSM cells, one or more WCDMA cells, one or more 3GPP LTE cells, and/or one or more CDMA2000 cells.

An advantage of some embodiments of the methods 90, 200, and 300 described herein is that, among the UEs of the wireless cellular network, only UEs camping on the first cell A need to be involved in signaling for determining whether the BS 5 can be safely disabled, whereas no signaling is required with UEs camping on other cells (e.g. cell B) belonging to the same tracking area. Hence, the methods may be performed with a relatively efficient utilization of communication resources.

According to some embodiments of the present invention, there is provided a control unit 410 for BS, such as the BS 5, of a wireless cellular network. According to these embodiments, the control unit 410 is adapted to perform any of the methods 90, 200, 300, and 342 described above with reference to various embodiments.

Figure 10:
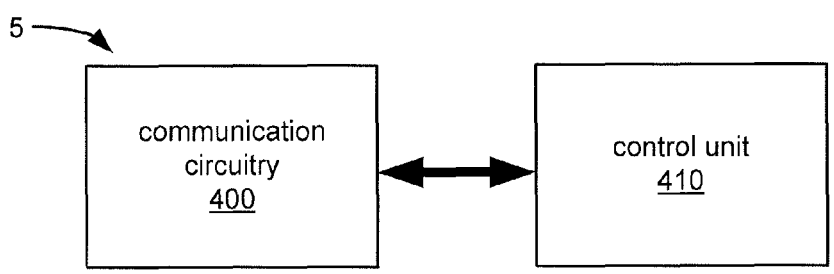
FIG. 10 is a block diagram of a radio base station according to embodiments of the present invention.

According to some embodiments, the control unit 410 is comprised in the BS 5. This is schematically illustrated in FIG. 10, showing a block diagram of an embodiment of the BS 5. According to this embodiment, the BS 5 comprises communication circuitry 400 and the control unit 410. The communication circuitry 400 may e.g. comprise transmitter circuitry, receiver circuitry, circuitry for demodulating and decoding received data, circuitry for coding and modulating data to be transmitted, etc, as is known in the art and therefore not further described in detail herein. Disabling the BS 5 may include disabling the communication circuitry 400 or one or more parts thereof. The wireless cellular network may comprise one or more BSs of the type illustrated in FIG. 10.

According to other embodiments, the control unit 410 is comprised in a unit of the wireless cellular network other than the BS 5, such as in a network controller or the like. The wireless cellular network may comprise one or more such control units 410.

Figure 11:
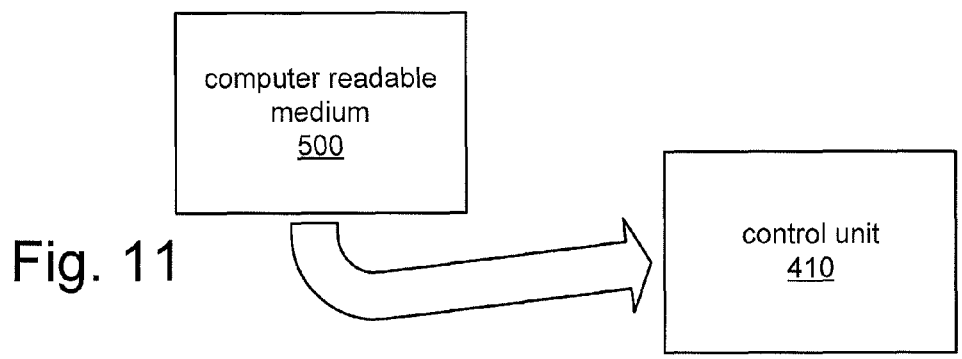
FIG. 11 schematically illustrates a computer readable medium and a control unit according to an embodiment of the present invention.

The control unit 410 (FIG. 10) may be implemented as an application-specific hardware unit. Alternatively, the control unit 410 or parts thereof may be implemented using one or more configurable or programmable hardware units, such as but not limited to one or more field-programmable gate arrays (FPGAs), processors, or microcontrollers. Accordingly, in some embodiments, the control unit 410 may be programmable. Hence, embodiments of the present invention may be embedded in a computer program product, which enables implementation of any of the methods and functions described herein, e.g. any of the methods 90, 200, 300, and 342 described above with reference to various embodiments. Therefore, according to embodiments of the present invention, there is provided a computer program product, comprising instructions arranged to cause the programmable control unit 410 to perform the steps of any of the embodiments of the methods 90, 200, 300 described above with reference to various embodiments. The computer program product may comprise program code which is stored on a computer readable medium 500, as illustrated in FIG. 11, which can be loaded and executed by the programmable control unit 410, to cause it to perform the steps of any of the embodiments of the methods 90, 200, 300 described above with reference to various embodiments.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A method of operating a radio base station of a first cell in a wireless cellular network, wherein each one of one or more user equipment (UE) devices of the wireless cellular network has a first mode, in which the radio base station is not aware of whether the UE device is currently camping on the first cell, and a second mode, in which the radio base station is aware of whether the UE device is currently camping on the first cell, comprising:

issuing a first message from the radio base station for causing UE devices in the first mode currently camping on the first cell to switch to the second mode such that the radio base station is made aware of which UE devices are currently camping on the first cell; and if the number of UE devices currently camping on the first cell is less than or equal to a threshold level, disabling the radio base station for saving energy;

wherein issuing the first message comprises one of the following:

changing a tracking-area identity of the first cell for causing the UE devices in the first mode currently camping on the first cell to perform a tracking area update; and broadcasting the first message in the first cell from the radio base station;

wherein the first message is an explicit message requesting that the UEs in the first mode currently camping on the first cell switch to the second mode.

2. A method according to claim 1, wherein the threshold level is zero.

3. A method according to claim 1, further comprising:

if there is one or more UE devices currently camping on the first cell:

issuing a second message from the radio base station to the one or more UE devices for causing each of the UE devices of the one or more UE devices to determine whether it is within coverage of another cell of the wireless cellular network;

receiving information from the each one of the one or more UE devices indicating whether the UE device is within coverage of another cell of the wireless cellular network; and if each UE of the one or more UE devices is within coverage of another cell of the wireless cellular network, disabling the radio base station for saving energy.

4. A non-transitory computer program product comprising computer program code means for executing the method according to claim 1 when said computer program code means are run by a programmable control unit configured to control the radio base station.

5. A non-transitory computer readable medium having stored thereon a computer program product comprising computer program code means for executing the method of claim 1, when said computer program code means are run by a programmable control unit configured to control the radio base station.

6. A control unit for a radio base station of a wireless cellular network, wherein the control unit is configured to perform the method of claim 1.

7. A radio base station for a wireless cellular network comprising a control unit according to claim 6.

8. A wireless cellular network comprising one or more control units according to claim 6.

9. A wireless cellular network comprising one or more radio base stations according to claim 7.

10. A method of operating a radio base station of a first cell in a wireless cellular network, wherein each one of one or more user equipment (UE) devices of the wireless cellular network has a first mode, in which the radio base station is not aware of whether the UE device is currently camping on the first cell, and a second mode, in which the radio base station is aware of whether the UE device is currently camping on the first cell, comprising:
- issuing a first message from the radio base station for causing UE devices in the first mode currently camping on the first cell to switch to the second mode such that the radio base station is made aware of which UE devices are currently camping on the first cell;
- broadcasting the first message from the radio base station for causing each UE device in the first mode currently camping on the first cell to determine whether a condition indicative of network coverage for the UE device in at least one other cell of the wireless cellular network is fulfilled and, if the condition is not fulfilled, to respond to the first message; and
- disabling the radio base station for saving energy only if a number of UE devices that respond to the first message is less than or equal to a threshold level;
- wherein issuing the first message comprises one of the following:
- changing a tracking-area identity of the first cell for causing the UE devices in the first mode currently camping on the first cell to perform a tracking area update; and
- wherein the first message is an explicit message requesting that the UEs in the first mode currently camping on the first cell switch to the second mode.

11. A method according to claim 10, further comprising:
- receiving information from one or more neighboring cells indicative of whether there is any of the UE devices camping on any of the neighboring cells in a border area between the first cell and the neighboring cell; and
- if the number of UE devices that respond to the first message is less than or equal to a threshold level and said the information from the neighboring cell indicates that there is none of the UE devices camping on any of the neighboring cells in a border area between the first cell and the neighboring cell, disabling the radio base station for saving energy.

12. A method according to claim 10, wherein the threshold level is zero.

13. A method according to claim 10, wherein the condition is that the UE device is within coverage of the at least one other cell.

14. A method according to claim 10, wherein the condition is that a signal-quality metric measured by the UE device is below a signal-quality threshold.

15. A method according to claim 14, wherein the signal-quality metric is an absolute signal-quality metric measured by the UE device on the first cell.

16. A method according to claim 15, wherein the signal-quality metric is a path loss measured by the UE device on the first cell.

17. A method according to claim 14, wherein the signal-quality metric is a relative signal-quality metric of a signal quality measured by the UE device on the first cell relative to a signal quality measured by the UE device on the at least one other cell.

18. A method according to claim 17, wherein the relative signal-quality metric is a relative path loss determined by a difference in decibels between a path loss measured by the UE device on the first cell and a path loss measured by the UE on the at least one other cell.

19. A method according to claim 14, wherein the signal-quality threshold is a parameter signaled to the UE device over a radio interface.

20. A method according to claim 14, wherein the signal-quality threshold is a pre-defined value or parameter.

21. A method according to claim 10, further comprising:
- enabling the radio base station prior to broadcasting the first message.

22. A method according to claim 21, further comprising:
- waiting for a predetermined first time period after enabling the radio base station and before broadcasting the first message.

23. A method according to claim 22, further comprising:
- repeating enabling the radio base station after the lapse of a predetermined second time period when enabling the radio base station causes the radio base station to be disabled.

24. A method of operating a radio base station of a first cell in a wireless cellular network, wherein each one of one or more user equipment (UE) devices of the wireless cellular network has a first mode, in which the radio base station is not aware of whether the UE device is currently camping on the first cell, and a second mode, in which the radio base station is aware of whether the UE device is currently camping on the first cell, comprising:
- disabling the radio base station;
- receiving information from one or more neighboring cells indicative of whether there is any of the UE devices camping on any of the neighboring cells, wherein a signal-quality metric measured by the UE on each one of a set of cells is below a threshold value; and
- if the information indicates that there is one of the UE devices camping on any of the neighboring cells, enabling the radio base station;
- issuing a first message from the radio base station for causing UE devices in the first mode currently camping on the first cell to switch to the second mode such that the radio base station is made aware of which UE devices are currently camping on the first cell;
- if the number of UE devices currently camping on the first cell is less than or equal to a threshold level, disabling the radio base station for saving energy;
- wherein issuing the first message comprises one of the following:
- changing a tracking-area identity of the first cell for causing the UE devices in the first mode currently camping on the first cell to perform a tracking area update; and
- broadcasting the first message in the first cell from the radio base station;
- wherein the first message is an explicit message requesting that the UEs in the first mode currently camping on the first cell switch to the second mode.

25. A method according to claim 24, wherein the information is exchanged between radio base stations over an X2 interface in an Evolved Universal Terrestrial Radio Access Network (E-UTRAN).

26. A method according to claim 24, wherein the wireless cellular network comprises at least one of:
- a Global System for Mobile communications (GSM) network;
- a Wideband Code-Division Multiple Access (WCDMA) network;
- a 3rd Generation Partnership Project Long Term Evolution (3GPP LTE) network; and
- a Code-Division Multiple Access 2000 (CDMA2000) network.

27. The method according to claim 24, wherein the first mode is an idle mode and the second mode is an active mode.

* * * * *